United States Patent
Miyamoto (10) Patent No.: US 10,903,634 B2
(45) Date of Patent: Jan. 26, 2021

(54) ELECTRICAL JUNCTION BOX

(71) Applicant: SUMITOMO WIRING SYSTEMS, LTD., Mie (JP)

(72) Inventor: Yuji Miyamoto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/959,222

(22) PCT Filed: Jan. 9, 2019

(86) PCT No.: PCT/JP2019/000369
§ 371 (c)(1),
(2) Date: Jun. 30, 2020

(87) PCT Pub. No.: WO2019/139042
PCT Pub. Date: Jul. 18, 2019

(65) Prior Publication Data
US 2020/0335956 A1    Oct. 22, 2020

(30) Foreign Application Priority Data

Jan. 10, 2018   (JP) .............................. 2018-002137

(51) Int. Cl.
*B60R 16/023*   (2006.01)
*H02G 3/08*   (2006.01)
*H02G 3/18*   (2006.01)

(52) U.S. Cl.
CPC ......... *H02G 3/081* (2013.01); *B60R 16/0239* (2013.01); *H02G 3/18* (2013.01)

(58) Field of Classification Search
CPC .............................................. B60R 16/0239
See application file for complete search history.

(56) References Cited

U.S. PATENT DOCUMENTS

2002/0043876 A1* 4/2002 Kawaguchi ......... B60R 16/0239
                                                              307/10.1
2007/0270033 A1* 11/2007 Yoshida .............. B60R 16/0239
                                                              439/587
(Continued)

FOREIGN PATENT DOCUMENTS

JP   2005-185018 A   7/2005
JP   2014-121224 A   6/2014
(Continued)

OTHER PUBLICATIONS

International Search Report dated Mar. 26, 2019 for WO 2019/139042 A1 (3 pages).

*Primary Examiner* — Hung V Ngo
(74) *Attorney, Agent, or Firm* — Abelman, Frayne & Schwab (57) ABSTRACT

Provided is an electrical junction box 10 including: a box body 12; an electrical component block attachment portion 36 that is open to an upper side of the box body 12 and extends in an upper-lower direction of the box body 12; and a plurality of electrical component blocks 38a and 38b attached in multiple stages in the upper-lower direction to the electrical component block attachment portion 36. A partitioning portion 44 is arranged between a lower face 42 of the electrical component block 38a arranged on an upper side in the upper-lower direction and an upper face 81 of the electrical component block 38b arranged on the lower side thereof, with gaps 82a and 82b being interposed between the partitioning portion and the faces. An electric wire 50 extending from the lower face 42 of the upper electrical component block 38a is held on the partitioning portion 44.

4 Claims, 5 Drawing Sheets

(56) References Cited

U.S. PATENT DOCUMENTS

| | | | |
|---|---|---|---|
| 2010/0319951 A1* | 12/2010 | Nakayama | B60R 16/0239 |
| | | | 174/50 |
| 2010/0326692 A1* | 12/2010 | Ozawa | B60R 16/0239 |
| | | | 174/50.52 |
| 2013/0119760 A1* | 5/2013 | Amano | B60R 16/0239 |
| | | | 307/10.1 |
| 2015/0303669 A1* | 10/2015 | Maebashi | B60R 16/0239 |
| | | | 174/68.2 |
| 2015/0366086 A1* | 12/2015 | Kajiwara | H01R 12/721 |
| | | | 361/736 |
| 2017/0070040 A1* | 3/2017 | Kawada | B60R 16/0238 |
| 2018/0312123 A1* | 11/2018 | Umemura | H05K 5/0213 |
| 2018/0376604 A1* | 12/2018 | Ohyama | H05K 5/0213 |

FOREIGN PATENT DOCUMENTS

| | | |
|---|---|---|
| JP | 5800628 B2 | 10/2015 |
| JP | 2016-208673 A | 12/2016 |

\* cited by examiner

ELECTRICAL JUNCTION BOX

CROSS REFERENCE TO RELATED APPLICATIONS

This application is a national phase of PCT application No. PCT/JP2019/000369, filed on 9 Jan. 2019, which claims priority from Japanese patent application No. 2018-002137, filed on 10 Jan. 2018, all of which are incorporated herein by reference.

TECHNICAL FIELD

The present invention relates to an electrical junction box that is mounted in an engine room of an automobile and the like.

BACKGROUND

Conventionally, box bodies of electrical junction boxes mounted in engine rooms of automobiles and the like accommodate various electrical components such as relays and fuses and efficiently distribute power sources, for example. In particular, following recent demand for a larger number of electrical devices and smaller vehicles, an electrical junction box including a box body to which electrical component blocks such as relay blocks are attached in upper and lower stages is proposed as described in Japanese Patent No. 5800628 (Patent Document 1). Accordingly, it is possible to improve the space efficiency of an electrical junction box, and to accommodate a larger number of electrical components in a box body.

PRIOR ART DOCUMENT

Patent Document

Patent Document 1: Japanese Patent No. 5800628

SUMMARY OF THE INVENTION

Problems to be Solved

Incidentally, in a conventional structure as in Patent Document 1, an electric wire extending from a lower face of an upper electrical component block may interfere with electrical components such as relays or fuses attached to an upper face of a lower electrical component block between electrical component blocks attached in upper and lower stages, resulting in problems in which the electric wire is entangled with the electrical components, or the electric wire repeatedly comes into contact with the electrical components due to vibrations of an automobile and the coating of the electric wire comes off, for example.

The present invention was achieved in light of the above-described circumstances, and an object thereof is to provide an electrical junction box with a new structure in which components can be advantageously prevented from interfering with each other between electrical component blocks attached in upper and lower two stages to a box body.

Means to Solve the Problem

The present invention is directed to an electrical junction box including: a box body; an electrical component block attachment portion that is open to an upper side of the box body and extends in an upper-lower direction of the box body; and a plurality of electrical component blocks attached in multiple stages in the upper-lower direction to the electrical component block attachment portion, wherein a partitioning portion is arranged between a lower face of the electrical component block arranged on an upper side in the upper-lower direction and an upper face of the electrical component block arranged on a lower side, with a gap being interposed between the partitioning portion and each of the faces, and an electric wire extending from the lower face of the upper electrical component block is held on the partitioning portion.

Effect of the Invention

According to the present invention, it is possible to advantageously prevent an electric wire extending from a lower face of an upper electrical component block from interfering with electrical components such as relays or fuses attached to an upper face of a lower electrical component block.

DETAILED DESCRIPTION TO EXECUTE THE INVENTION

First, embodiments of the present invention will be listed and described.

A first aspect of the present invention is directed to an electrical junction box including: a box body; an electrical component block attachment portion that is open to an upper side of the box body and extends in an upper-lower direction of the box body; and a plurality of electrical component blocks attached in multiple stages in the upper-lower direction to the electrical component block attachment portion, wherein a partitioning portion is arranged between a lower face of the electrical component block arranged on an upper side in the upper-lower direction and an upper face of the electrical component block arranged on a lower side, with a gap being interposed between the partitioning portion and each of the faces, and an electric wire extending from the lower face of the upper electrical component block is held on the partitioning portion.

According to this aspect, in an electrical junction box having a plurality of electrical component blocks attached in multiple stages in the upper-lower direction to an electrical component block attachment portion of a box body, a partitioning portion is arranged between an upper electrical component block and a lower electrical component block. Accordingly, an electric wire extending from the lower face of the upper electrical component block is held on the partitioning portion, and thus the electric wire is held in a state of non-contact with the upper face of the lower electrical component block. As a result, the electric wire extending from the lower face of the upper electrical component block is advantageously prevented from interfering with electrical components such as relays or fuses attached to the upper face of the lower electrical component block, so that problems can be reliably prevented from occurring in which the electric wire is entangled with the electrical components, or the electric wire repeatedly comes into contact with the electrical components due to vibrations of an automobile and the coating of the electric wire comes off, for example.

Note that it is sufficient that the partitioning portion is arranged between the upper and lower electrical component blocks, and, for example, it may have a structure of being supported by the box body, or a structure of being supported by the block main body of the upper electrical component block or the block main body of the lower electrical component block.

A second aspect of the present invention is directed to the electrical junction box according to the first aspect, wherein the upper electrical component block includes a block main body in which an electrical component and the electric wire are accommodated and held, and a lower cover that covers the lower face of the block main body from below, and the partitioning portion is constituted by the lower cover.

According to this aspect, the partitioning portion is constituted by the lower cover of the upper electrical component block, and thus the partitioning portion can be integrally attached to and held on the upper electrical component block. Accordingly, for example, in an automobile production line, it is possible to attach the partitioning portion to an appropriate point merely by first assembling electrical components such as relays or fuses to the upper face of the lower electrical component block, and then attaching the upper electrical component block to the electrical component block from above, and thus the operation efficiency can be improved compared with the case in which the upper electrical component block and the partitioning portion are separately assembled. Incidentally, when wire harnesses are supplied to an automobile production line, the upper electrical component block has to be temporarily held on another position such that electrical components can be assembled to the lower electrical component block in the production line. Also in that case, the electric wire extending from the upper electrical component block can be stably held, and thus the electric wire can be prevented in advance from interfering with other members.

A third aspect of the present invention is directed to the electrical junction box according to the second aspect, wherein the lower cover has an electric wire outlet port that is open at a position that is closer to an outer side than a peripheral edge of the lower electrical component block is, and the electric wire extending from the electric wire outlet port is guided to a gap that is formed closer to an inner side of the box body than a peripheral wall portion of the lower electrical component block is.

According to this aspect, the lower cover has an electric wire outlet port, and an electric wire extending from the electric wire outlet port is guided to a gap that is formed closer to an inner side of the box body than a peripheral wall portion of the lower electrical component block is. Accordingly, the lower cover also has the function of guiding an electric wire extending from the upper electrical component block, and thus the electric wire can be reliably prevented from interfering with the lower electrical component block.

A fourth aspect of the present invention is directed to the electrical junction box according to the third aspect, wherein a lower face of the lower cover is an inclined face that is inclined downward to the electric wire outlet port.

According to this aspect, the lower face of the lower cover is inclined downward to the electric wire outlet port, and thus the electric wire can be smoothly guided from the electric wire outlet port.

A fifth aspect of the present invention is directed to the electrical junction box according to the third or fourth aspect, wherein part of a peripheral wall portion of the electrical component block attachment portion is provided with a cut-out portion, and the electric wire extending from the electric wire outlet port and through the cut-out portion is guided to the gap.

According to this aspect, a cut-out portion for regulating a guiding passage of an electric wire is provided not only at the electric wire outlet port of the lower cover but also at the electrical component block attachment portion side of the box body, and thus it is possible to realize the function of more stably guiding an electric wire and the function of preventing an electric wire from interfering with other members.

Hereinafter, an embodiment of the present invention will be described with reference to the drawings. Note that, in all drawings, similar constituent elements are denoted by similar reference numerals and a description thereof has been omitted as appropriate.

Figure 1:
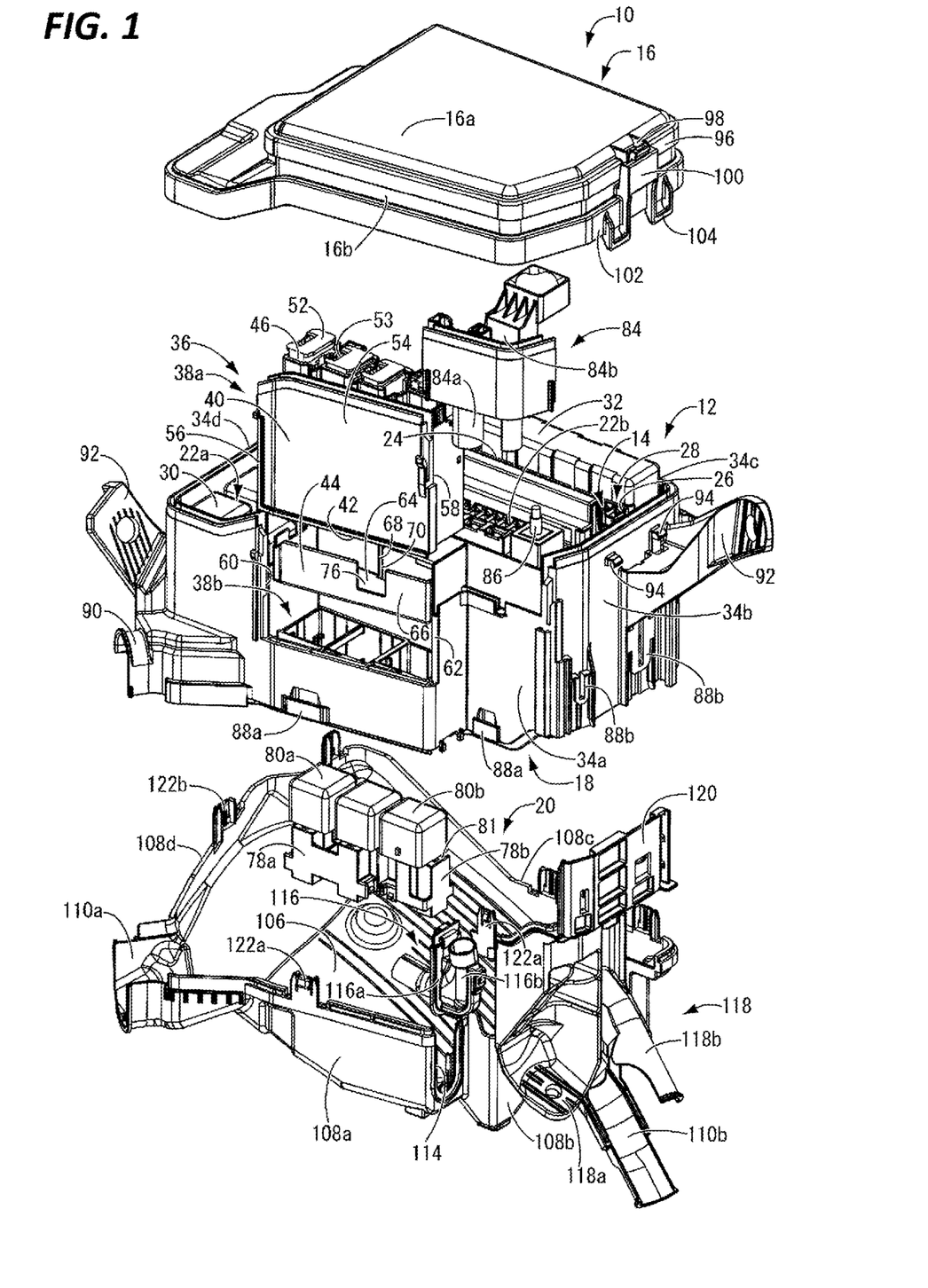
FIG. 1 is an exploded perspective view showing an electrical junction box as an embodiment of the present invention.

FIGS. 1 to 6 show an electrical junction box 10 as an embodiment of the present invention. As shown in FIG. 1, the electrical junction box 10 includes a box body 12, an upper case 16 that covers an upper face 14 of the box body 12, and a lower case 20 that covers a lower face 18 of the box body 12. Note that, in the description below, "upper" refers to an upper side in FIGS. 1, 2, 5, and 6, and "lower" refers to a lower side in FIGS. 1, 2, 5, and 6. Also, "front" refers to a left side in FIG. 4, "rear" refers to a right side in FIG. 4, "length direction" refers to a left-right direction in FIG. 4, and "width direction" refers to an upper-lower direction in FIG. 4.

The box body 12 is in the shape of a cuboid block as a whole, and is formed in one piece through injection molding or the like, for example, from an insulating synthetic resin such as polypropylene (PP) or polyamide (PA). As shown in FIG. 1, relay attachment portions 22a and 22b, a resistor attachment portion 24, and a fuse attachment portion 26 are formed so as to open upward on the upper face 14 of the box body 12. Furthermore, a plurality of terminal accommodating holes 28 are formed so as to open downward on the lower face 18 of the box body 12, partially as shown in the upper right in FIG. 6. Although not shown, crimp terminals or the like crimped to ends of electric wires as conductive members are accommodated and arranged in the terminal accommodating holes 28, and a bus bar or the like as a conductive member constituting an electric circuit is attached to and supported by a bus bar accommodating groove or the like.

Furthermore, as shown in FIG. 1, a relay 30, a resistor 32, and a fuse (not shown) are attached to the relay attachment portion 22a, the resistor attachment portion 24, and the fuse attachment portion 26 from the upper face 14 side of the box body 12. Accordingly, unshown tab terminals projecting from the relay 30, the resistor 32, and the fuse are conducted and connected to the crimp terminals at the ends of the electric wires, the bus bar, and the like.

Figure 2:
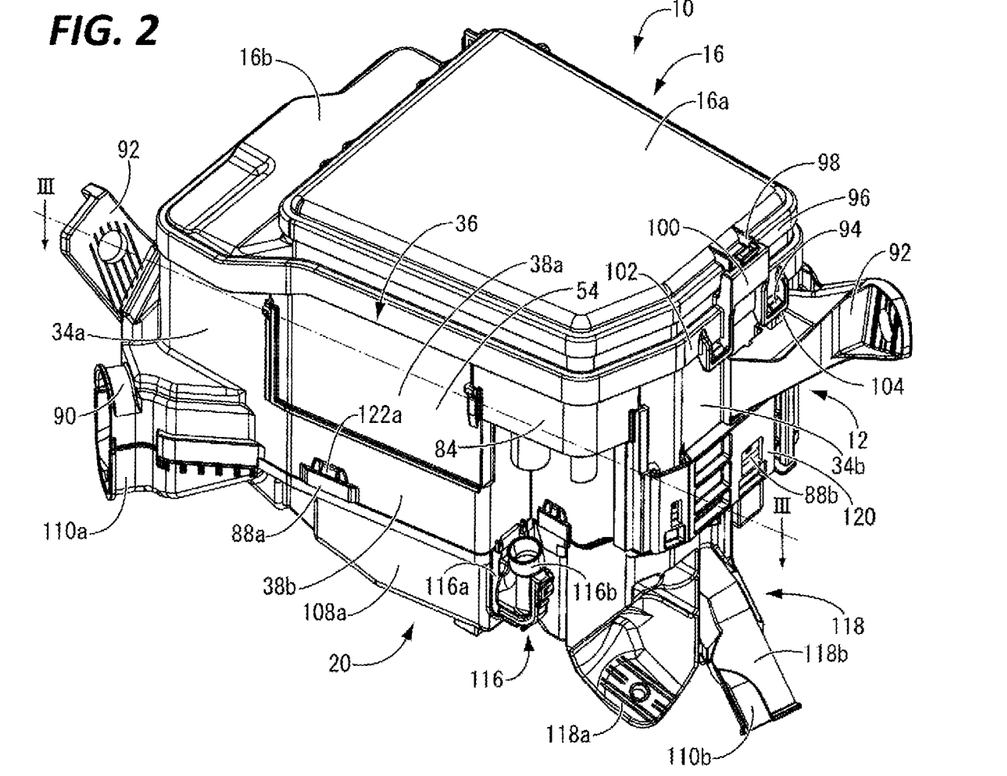
FIG. 2 is an overall perspective view showing a state in which the electrical junction box shown in FIG. 1 is assembled.
Figure 5:
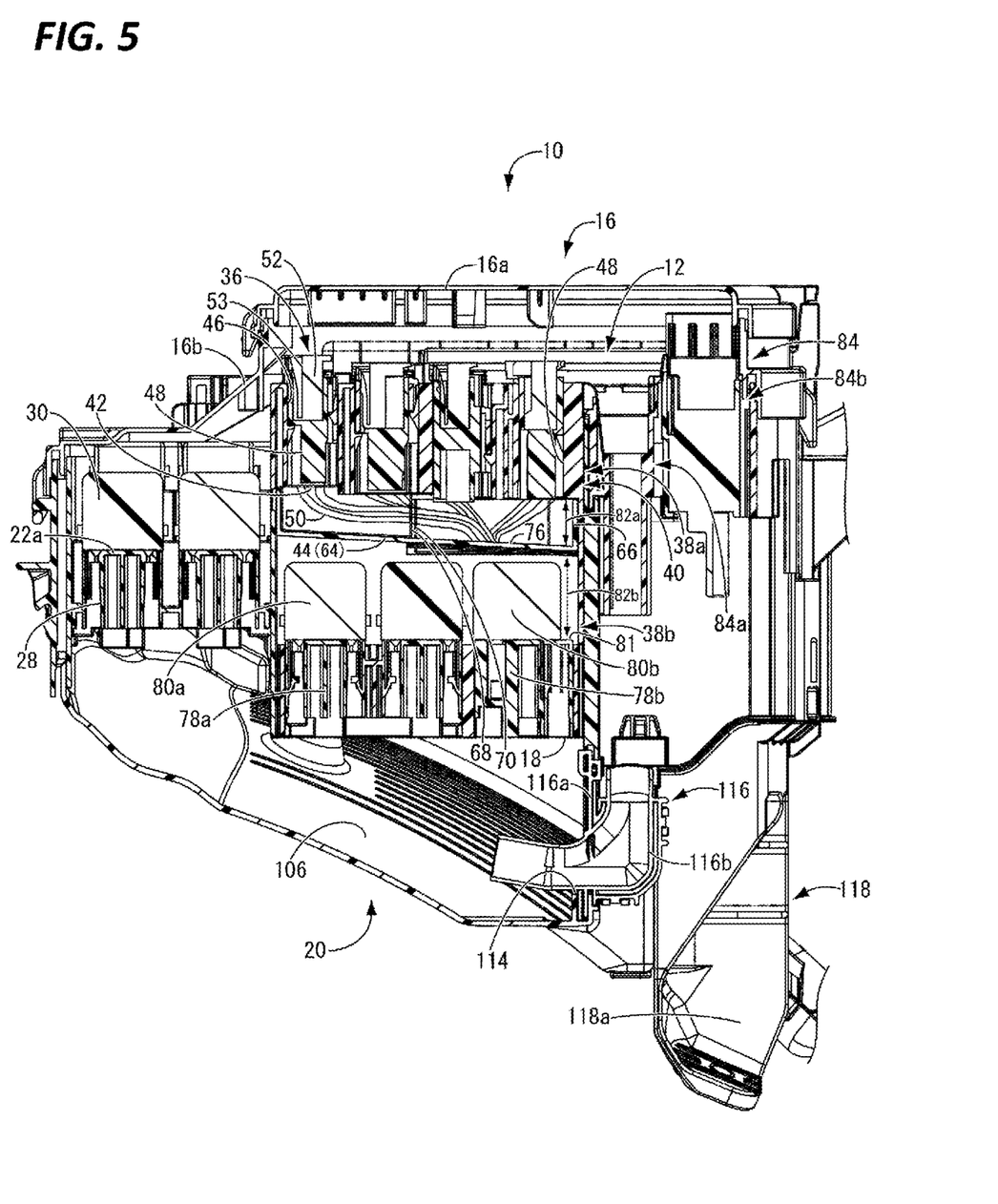
FIG. 5 is an enlarged view of the cross-section taken along V-V in FIG. 4.

Furthermore, as shown in FIGS. 1 and 2, the box body 12 has peripheral wall portions 34a to 34d substantially in the shape of a rectangular frame that is continuous around the entire periphery from the outer peripheral edge of the box body 12. In this example, it is assumed that the peripheral wall portion 34*a* is a peripheral wall portion at the front in the width direction, the peripheral wall portion 34*c* is a peripheral wall portion at the back in the width direction, the peripheral wall portion 34*b* is a peripheral wall portion at the rear in the length direction, and the peripheral wall portion 34*d* is a peripheral wall portion at the front in the length direction. An electrical component block attachment portion 36, substantially in the shape of a cuboid block as a whole that is open in the upper-lower direction of the box body 12 and extends substantially over the entire length in the upper-lower direction, is provided so as to project outward from the peripheral wall portion 34*a*, substantially at the center in the length direction of the peripheral wall portion 34*a*. As shown in FIGS. 1 and 5, an electrical component block 38*a* is arranged on the upper side of the electrical component block attachment portion 36, and an electrical component block 38*b* is arranged on the lower side thereof. More specifically, the upper electrical component block 38*a* is substantially in the shape of a cuboid block as a whole, and is configured to be fitted to the upper side of the electrical component block attachment portion 36 from above by means of a slide mechanism, and to be accommodated and held therein.

Figure 3:
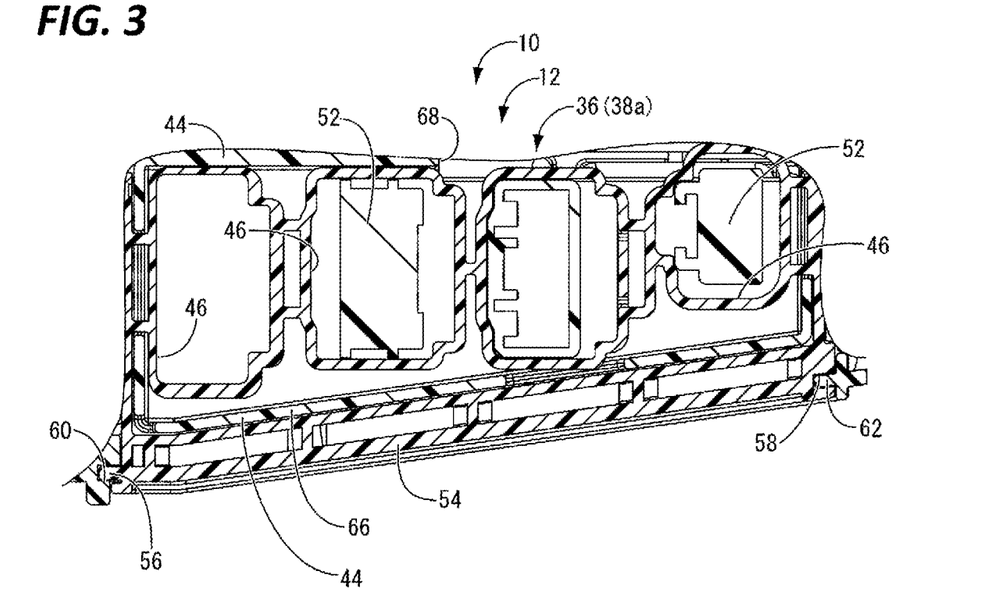
FIG. 3 is a partially enlarged view of the cross-section taken along in FIG. 2.

The upper electrical component block 38*a* has a block main body 40, and a lower cover 44 that covers a lower face 42 of the block main body 40 from below. Four connector attachment portions 46 substantially in the shape of cuboid boxes that are open upward are formed on the upper face of the block main body 40, and, as shown in FIG. 5, a large number of terminal accommodating holes 48 are formed so as to open downward on the lower face 42 of the block main body 40. Furthermore, the configuration is such that an unshown crimp terminal or the like crimped to ends of electric wires 50 are accommodated and held in the terminal accommodating holes 48, and connectors 52, which are electrical components, are accommodated in the connector attachment portions 46 so that the crimp terminals or the like provided at the ends of the electric wires 50 are connected to unshown tab terminals. Although not shown, crimp terminals or the like crimped to ends of electric wires are accommodated and held in terminal accommodating holes 53 that are open on the upper face of the connectors 52, and the electric wires extend from upper openings of the terminal accommodating holes 53 of the connectors 52. Hereinafter, the slide mechanism of the upper electrical component block 38*a* described above relative to the electrical component block attachment portion 36 will be described with reference to FIGS. 1 and 3. This slide mechanism includes a protruding ridge 56 that is formed at the front end of a wall portion 54 on the front side of the upper electrical component block 38*a* and that has a shape with a substantially rectangular cross-section and extending in the upper-lower direction, a recessed groove 58 that is formed at the rear end of the wall portion 54 and that has a shape with a substantially rectangular cross-section and extending in the upper-lower direction, and a recessed groove 60 and a protruding ridge 62 of the electrical component block attachment portion 36 provided respectively at positions corresponding to the protruding ridge 56 and the recessed groove 58.

Figure 6:
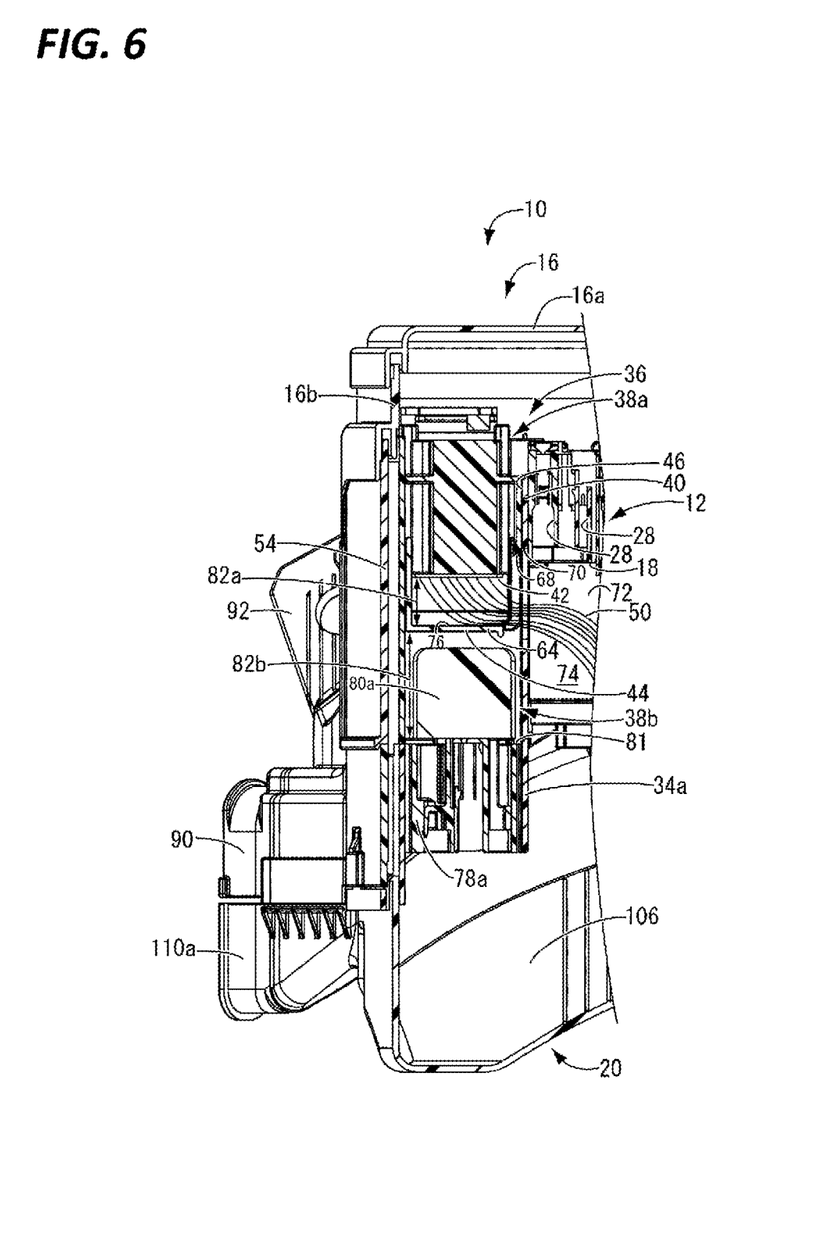
FIG. 6 is a partially enlarged view of the cross-section taken along VI-VI in FIG. 4.

As shown in FIG. 1, the lower cover 44 is substantially in the shape of a cuboid box as a whole, and has a bottom wall 64 substantially in the shape of a rectangular flat plate, and a peripheral wall portion 66 provided so as to project upward from the outer peripheral edge of the bottom wall 64 substantially around the entire periphery thereof. The rear portion on the back side of the peripheral wall portion 66 is cut out substantially over the entire portion, so that an electric wire outlet port 68 is formed. The electric wire outlet port 68 is open at a position that is closer to the outer side (the right side in FIG. 6) than the peripheral edge of the lower electrical component block 38*b* is. Furthermore, as shown in FIG. 6, the peripheral wall portion 34*a* of the box body 12 (the peripheral wall portion of the electrical component block attachment portion 36) is cut out at a portion thereof corresponding to the peripheral wall portion of upper electrical component block 38*a* facing the electric wire outlet port 68, so that a cut-out portion 70 is provided. The electric wires 50 extending from the lower face 42 of the block main body 40 of the upper electrical component block 38*a* extend through the electric wire outlet port 68 and the cut-out portion 70, and is guided to a gap 74 that is formed between the peripheral wall portion 34*a* of the box body 12 corresponding to the peripheral wall portion of the lower electrical component block 38*b* and an inner peripheral face 72 of the peripheral wall portions 34*a* to 34*d* of the box body 12, that is, the gap 74 that is formed closer to the inner side of the box body 12 than the peripheral wall portion 34*a* constituting the lower electrical component block 38*b* is. Accordingly, the lower cover 44 has the effect of guiding the electric wires 50 extending from the lower face 42 of the block main body 40 of the upper electrical component block 38*a* through the electric wire outlet port 68, and thus the electric wires 50 can be reliably prevented from interfering with the lower electrical component block 38*b*. Moreover, since the peripheral wall portion 34*a* of the box body 12 on the electrical component block attachment portion 36 side is also provided with the cut-out portion 70 for regulating the guiding passage of the electric wires 50, it is possible to realize the function of more stably guiding the electric wires 50 and the function of preventing the electric wires 50 from interfering with other members such as the lower electrical component block 38*b*. In addition, as shown in FIG. 5, an upper face 76 of the bottom wall 64 corresponding to the lower face of the lower cover 44 is an inclined face that is inclined downward to the electric wire outlet port 68, and thus the electric wires 50 are smoothly guided from the electric wire outlet port 68 and the cut-out portion 70.

Meanwhile, as shown in FIG. 1, the lower electrical component block 38*b* is substantially in the shape of a rectangular frame that is open in the upper-lower direction, and relay attachment portions 78*a* and 78*b* substantially in the shape of cuboid blocks are fitted from the lower side of the lower electrical component block 38*b*, and accommodated and held therein. Relays 80*a* and 80*b* are attached from above to the relay attachment portions 78*a* and 78*b* of the lower electrical component block 38*b*.

When assembling the electrical component block attachment portion 36, the upper electrical component block 38*a* in which the lower cover 44 is attached from the lower face 42 side to the block main body 40 by means of an unshown engagement mechanism is temporarily fastened to a predetermined position that is on the box body 12 but that is not above the electrical component block attachment portion 36. In this state, the relays 80*a* and 80*b* are attached from above to the relay attachment portions 78*a* and 78*b* of the lower electrical component block 38*b*. Accordingly, the relays 80*a* and 80*b* can be easily attached while reducing interference with the electric wires 50 extending from the upper electrical component block 38*a* and the lower face 42 thereof. Lastly, the upper electrical component block 38*a* is moved to the upper end of the electrical component block attachment portion 36, and the upper electrical component block 38a is arranged on the lower electrical component block 38b by means of the above-described slide mechanism. As a result, as shown in FIGS. 5 and 6, the lower cover 44 constituting a partitioning portion is arranged between the lower face 42 of the block main body 40 of the electrical component block 38a arranged on the upper side of the electrical component block attachment portion 36 and an upper face 81 of the electrical component block 38b arranged on the lower side thereof, with gaps 82a and 82b being interposed between the lower cover 44 and the faces 42 and 81. Furthermore, the configuration is such that the electric wires 50 extending from the lower face 42 of the block main body 40 of the upper electrical component block 38a are held on the upper face 76 of the bottom wall 64 of the lower cover 44. The gap 82a, and the gap between the lower cover 44 and the relay 80b are, for example, 2 to 3 mm.

Furthermore, as shown in FIGS. 1 and 2, an electric wire cover member 84 substantially in the shape of a cuboid block as a whole is attached to the upper side at the rear of the electrical component block attachment portion 36 provided on the peripheral wall portion 34a. As shown in FIGS. 1 and 5, an electric wire outlet portion 84a substantially in the shape of a cylinder that is open in the upper-lower direction is provided at the front in the length direction of the electric wire cover member 84 (the left side in FIG. 5), and an L-shaped terminal-attached electric wire outlet portion 84b is provided at the rear in the length direction thereof (the right side in FIG. 5). The electric wire outlet portion 84a regulates unshown electric wires extending from the upper face of the connectors 52 of the box body 12 (see FIG. 1) downward together. Meanwhile, the upper side of the L-shaped terminal-attached electric wire outlet portion 84b has a substantially box-like terminal accommodating portion that is open downward and is in the shape like an inverted letter "L" when viewed from the back, and the lower side thereof has a substantially pipe-like electric wire outlet portion that is open in the upper-lower direction and the back side. Furthermore, the L-shaped terminal-attached electric wire outlet portion 84b is used to cover unshown L-shaped terminal-attached electric wires connected to a stud bolt 86 provided in a projecting manner on the front side at the rear of the upper face 14 of the box body 12, and to regulate electric wires extending therethrough downward.

Furthermore, as shown in FIGS. 1 and 2, engageable portions 88a and 88b substantially in the shape of rectangular frames are provided at two points that are away from each other in the length direction at the lower ends of the peripheral wall portions 34a to 34d, and an electric wire outlet portion 90 substantially in the shape of a semi-cylinder extending outward and obliquely to the front side is provided at the front of the lower end of the peripheral wall portion 34a. Furthermore, attachment leg portions 92 substantially in the shape of flat plates extending outward and obliquely to the upper side are provided at the upper side at the back of the peripheral wall portion 34b and the lower end at the front of the peripheral wall portion 34d. In addition, a pair of protruding engagement portions 94 are provided so as to project outward at points that are away from each other in the peripheral direction, on the upper side of the attachment leg portion 92 of the peripheral wall portion 34b.

Figure 4:
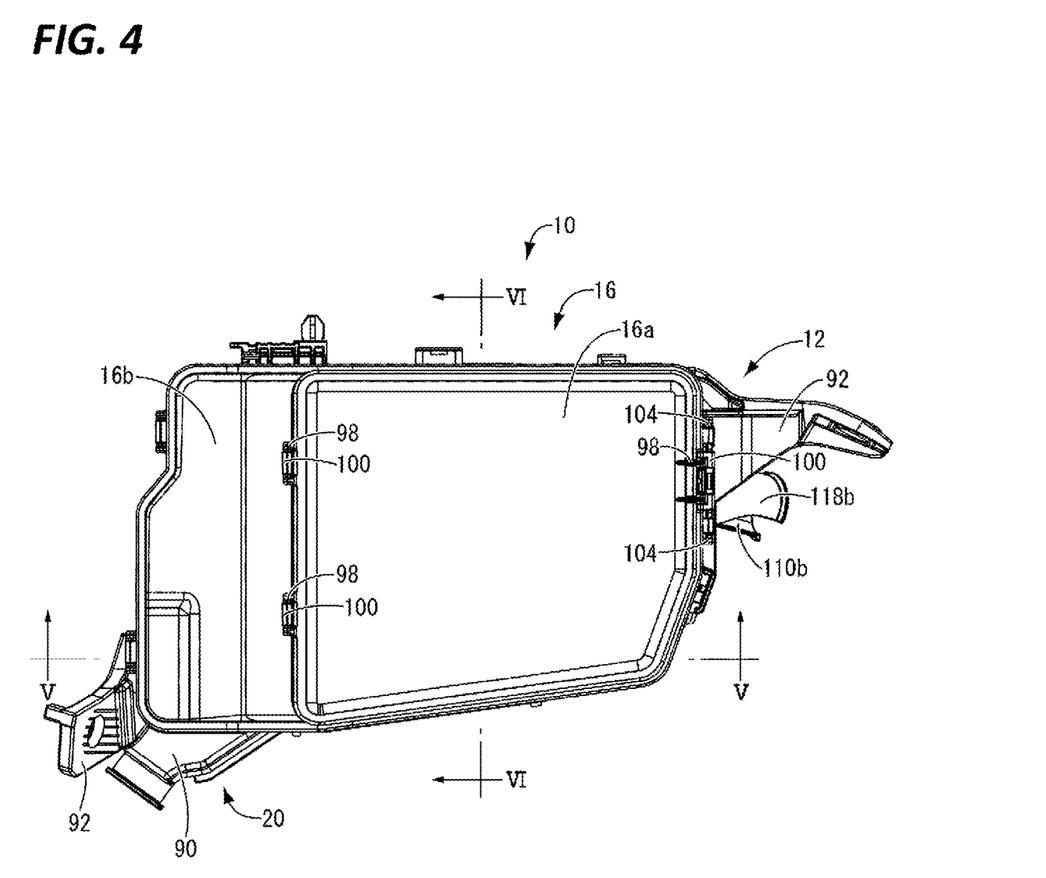
FIG. 4 is a plan view of the electrical junction box shown in FIG. 2.

As shown in FIGS. 1, 2, and 4, the upper case 16 is substantially in the shape of a cuboid box that is open downward as a whole, and is formed in one piece through injection molding or the like, for example, from an insulating synthetic resin such as polypropylene (PP) or polyamide (PA). More specifically, the upper case 16 includes a first upper case 16a substantially in the shape of a cuboid box that is open downward, and a second upper case 16b that is open in the upper-lower direction and is formed larger than the first upper case 16a in a plan view. That is to say, engageable portions 98 in the shape of frames are provided so as to project downward at positions on a peripheral wall portion 96 facing each other in the front-rear direction (the left-right direction in FIG. 4) of the first upper case 16a, and engagement portions 100 in the shape of frames are provided so as to project upward, at positions facing the engageable portions 98, on the peripheral edge at the upper opening of the second upper case 16b. Furthermore, when the first upper case 16a is attached from above so as to cover the upper opening of the second upper case 16b, the engageable portions 98 of the first upper case 16a and the engagement portions 100 of the second upper case 16b become engaged with each other to form the upper case 16. In addition, engageable portions 104 in the shape of frames are provided so as to project downward at positions on a peripheral wall portion 102 facing each other in the front-rear direction (the left-right direction in FIG. 4) of the second upper case 16b.

When assembling the upper case 16 to the upper opening of the box body 12, as shown in FIG. 1, the upper case 16 is inserted such that the inner peripheral face of the peripheral wall portion 102 thereof overlaps the outer circumferential faces of the upper ends of the peripheral wall portions 34a to 34d of the box body 12. Furthermore, when the upper case 16 is further inserted toward the box body 12, as shown in FIGS. 1 and 2, the engageable portions 104 in the shape of frames of the upper case 16 engage with the engagement portions 94 of the box body 12, and thus the upper case 16 is locked in a state of being attached to the upper opening of the box body 12.

As shown in FIGS. 1 and 2, the lower case 20 is in the shape of a bottomed box that is open upward, and is formed in one piece through injection molding or the like, for example, from an insulating synthetic resin such as polypropylene (PP) or polyamide (PA). In a plan view, the lower case 20 is in the shape of a rectangle that is substantially the same as the lower face 18 of the box body 12. More specifically, the lower case 20 has a bottom wall 106 substantially in the shape of a rectangular flat plate, and peripheral wall portions 108a to 108d provided so as to project upward from the outer peripheral edge of the bottom wall 106 substantially around the entire periphery. In this example, the peripheral wall portion 108a is a peripheral wall portion at the front in the width direction, the peripheral wall portion 108c is a peripheral wall portion at the back in the width direction, the peripheral wall portion 108b is a peripheral wall portion at the rear in the length direction, and the peripheral wall portion 108d is a peripheral wall portion at the front in the length direction. Electric wire outlet portions 110a and 110b substantially in the shape of semi-cylinders extending outward and obliquely to the front side are provided at the front of the lower end of the peripheral wall portion 108a and the center in the peripheral direction of the peripheral wall portion 108b. The upper face of the bottom wall 106 of the lower case 20 is an inclined face that is inclined downward to the electric wire outlet portions 110a and 110b.

Furthermore, as shown in FIGS. 1 and 2, an electric wire outlet member 116 is fitted to a cut-out portion 114 provided on the front side of the peripheral wall portion 108b of the lower case 20, and an electric wire outlet member 118 is attached to the outer face thereof. The electric wire outlet member 116 includes a lid portion 116a substantially in the shape of a rectangular flat plate that covers the cut-out portion 114, and an electric wire outlet portion 116b in the shape of a cylinder extending through the lid portion 116a and substantially in the shape like a letter "L", and is used to guide unshown electric wires upward. Meanwhile, an attachment leg portion 118a substantially in the shape of a flat plate extending outward and slightly downward is provided at the front of the lower end of the electric wire outlet member 118, and an electric wire outlet portion 118b substantially in the shape of a semi-cylinder extending outward and obliquely to the lower side is provided on the back side thereof. Furthermore, an engagement portion 120 is provided so as to project upward at the upper end of the electric wire outlet member 118. Furthermore, when the electric wire outlet member 118 is attached to the peripheral wall portion 108b of the lower case 20, the electric wire outlet portion 110b of the lower case 20 and the electric wire outlet portion 118b of the electric wire outlet member 118 are assembled to each other to form an electric wire outlet port that is used to guide unshown electric wires rearward and obliquely to the lower side.

In addition, engagement portions 122a and 122b are provided so as to project upward, at positions facing the engageable portions 88a and 88b of the box body 12, on the opening end of the peripheral wall portions 108a to 108d of the lower case 20. Furthermore, when the engagement portions 122a and 122b become engaged with the engageable portions 88a and 88b of the box body 12, the lower case 20 is attached to the lower opening of the box body 12 so as to be fitted and held therein.

According to the electrical junction box 10 with this structure, the lower cover 44 constituting a partitioning portion is arranged between the lower face 42 of the block main body 40 of the electrical component block 38a arranged on the upper side of the electrical component block attachment portion 36 and the upper face 81 of the electrical component block 38b arranged on the lower side thereof, with the gaps 82a and 82b being interposed between the lower cover 44 and the faces 42 and 81. Furthermore, the configuration is such that the electric wires 50 extending from the lower face 42 of the block main body 40 of the upper electrical component block 38a are held on the upper face 76 of the bottom wall 64 of the lower cover 44. Accordingly, since the electric wires 50 are held in a state of non-contact with the upper face 81 of the electrical component block 38b arranged on the lower side thereof, the electric wires 50 are advantageously prevented from interfering with electrical components such as the relays 80a and 80b attached to the upper face 81 of the lower electrical component block 38b. Accordingly, it is possible to reliably prevent problems such as damages to the electric wires 50 due to entanglement of the electric wires 50 with the electrical components or repeated contact of electrical components due to vibrations of an automobile.

Furthermore, since the partitioning portion is constituted by the lower cover 44 provided on the upper electrical component block 38a, the operation efficiency can be improved compared with the case in which the upper electrical component block 38a and the partitioning portion are separately assembled. Incidentally, when wire harnesses are supplied to an automobile production line, the upper electrical component block 38a is temporarily held on another position or the like on the box body 12 such that the relays 80a and 80b, which are electrical components, can be assembled to the lower electrical component block 38b in the production line. Also in that case, the electric wires 50 extending from the upper electrical component block 38a can be stably held by the lower cover 44, and thus the electric wires 50 can be prevented in advance from interfering with other members.

Although an embodiment of the present invention has been described above, the present invention is not intended to be limited to those specific descriptions. For example, in the foregoing embodiment, the partitioning portion is constituted by the lower cover 44, but it may be constituted by any member arranged between the upper and lower electrical component blocks 38a and 38b, and may be constituted by, for example, a partitioning portion in the shape of a flat plate that is slid and held on the peripheral wall portions 34a to 34d or a partitioning wall of the box body 12. Furthermore, in the foregoing embodiment, the lower cover 44 is formed so as to be supported on the upper electrical component block 38a, but it may be formed so as to be supported, for example, on the electrical component block attachment portion 36 or on the box body 12. Furthermore, in the foregoing embodiment, the case was described in which the electrical component blocks 38a and 38b are provided in upper and lower two stages, but it will be appreciated that they may be provided in three or more stages.

LIST OF REFERENCE NUMERALS

10 Electrical junction box
12 Box body
34a-34d Peripheral wall portion
36 Electrical component block attachment portion
38a, 38b Electrical component block
40 Block main body
42 Lower face
44 Lower cover (partitioning portion)
50 Electric wire
52 Connector (electrical component)
68 Electric wire outlet port
70 Cut-out portion
72 Inner peripheral face
74 Gap
76 Upper face
81 Upper face
82a, 82b Gap

What is claimed is:
1. An electrical junction box comprising: a box body; an electrical component block attachment portion that is open to an upper side of the box body and extends in an upper-lower direction of the box body; and a plurality of electrical component blocks attached in multiple stages in the upper-lower direction to the electrical component block attachment portion,
wherein a partitioning portion is arranged between a lower face of the electrical component block arranged on an upper side in the upper-lower direction and an upper face of the electrical component block arranged on a lower side, with a gap being interposed between the partitioning portion and each of the faces,
an electric wire extending from the lower face of the upper electrical component block is held on the partitioning portion,
the upper electrical component block includes a block main body in which an electrical component and the electric wire are accommodated and held, and a lower cover that covers the lower face of the block main body from below, and the partitioning portion is constituted by the lower cover, the electrical component block attachment portion is integrally provided in the box body, and an electrical component can be attached to the lower electrical component block attached to the box body in a state in which the upper electrical component block is not attached to the electrical component block attachment portion.

2. The electrical junction box according to claim 1, wherein the lower cover has an electric wire outlet port that is open at a position that is closer to an outer side than a peripheral edge of the lower electrical component block is, and the electric wire extending from the electric wire outlet port is guided to a gap that is formed closer to an inner side of the box body than a peripheral wall portion of the lower electrical component block is.

3. The electrical junction box according to claim 2, wherein part of a peripheral wall portion of the electrical component block attachment portion is provided with a cut-out portion, and the electric wire extending from the electric wire outlet port and through the cut-out portion is guided to the gap.

4. The electrical junction box according to claim 1, wherein a lower face of the lower cover is an inclined face that is inclined downward to the electric wire outlet port.

* * * * *